(12) United States Patent
Lakshminarayana et al.

(10) Patent No.: US 7,239,768 B2
(45) Date of Patent: Jul. 3, 2007

(54) PHOTONIC INTEGRATED CIRCUIT

(75) Inventors: Ganesh Lakshminarayana, Plainsboro, NJ (US); Jithamithra Sarathy, Atlantic Highlands, NJ (US); Boris Stefanov, Gillette, NJ (US)

(73) Assignee: Alphion Corporation, Princeton Junction, NJ (US)

( * ) Notice: Subject to any disclaimer, the term of this patent is extended or adjusted under 35 U.S.C. 154(b) by 152 days.

(21) Appl. No.: 11/142,924

(22) Filed: Jun. 2, 2005

(65) Prior Publication Data

US 2006/0018587 A1  Jan. 26, 2006

Related U.S. Application Data

(60) Provisional application No. 60/576,257, filed on Jun. 2, 2004.

(51) Int. Cl.
*G02B 6/26* (2006.01)
*G02F 1/01* (2006.01)

(52) U.S. Cl. .............................. 385/14; 385/39; 359/326
(58) Field of Classification Search .................... None
See application file for complete search history.

(56) References Cited

U.S. PATENT DOCUMENTS 5,933,554 A * 8/1999 Leuthold et al. ............... 385/28
6,208,455 B1 * 3/2001 Ueno et al. .................. 359/332
6,775,481 B2 * 8/2004 Janz et al. .................. 398/175
2004/0001247 A1 * 1/2004 Nojima ....................... 359/326

FOREIGN PATENT DOCUMENTS

JP      2-93626 A  *  4/1990

OTHER PUBLICATIONS

L. H. Spiekman et al. All-optical Mach-Zehnder wavelength converter with monolithically integrated DFB probe source. IEEE Photonics Technology Letters, 9(10), pp. 1349-1351, Oct. 1997.*
J. Leuthold et al. All-optical Mach-Zehnder interferometer wavelength converters and switches with integrated data- and control-signal separation scheme. Journal of Lightwave Technology, 17(6), pp. 1056-1066, Jun. 1999.*

* cited by examiner

*Primary Examiner*—Rodney Bovernick
*Assistant Examiner*—Mike Stahl
(74) *Attorney, Agent, or Firm*—Kaplan Gilman Gibson & Dernier LLP (57) ABSTRACT

A integrated optical circuit comprises an interferometer having a first optical path and a second optical path configured for regenerating an input signal entering the first path by interference at a first coupler between continuous wave (CW) signals from the two optical paths, and a third optical path configured such that a canceling signal passing therethrough cancels, at a second coupler, a traveling signal from the first arm. When the device is operated in a counter-propagative mode, the traveling signal is the CW signal from the first arm. When the device is operated in a co-propagative mode, the traveling signal is the input signal from the first arm.

26 Claims, 5 Drawing Sheets

PHOTONIC INTEGRATED CIRCUIT

RELATED APPLICATIONS

This present application claims the benefit of U.S. provisional application No. 60/576,257 filed on Jun. 2, 2004, the entirety of which is incorporated here by reference.

BACKGROUND OF THE INVENTION

The present invention relates to all-optical signal regeneration and reshaping techniques, and more particularly, to a photonic integrated subcircuit having a honeycomb architecture for performing photonic signal regeneration and re-shaping (P2R) in the counter-propagative or co-propagative operation. The present invention further relates to an integrated optical circuit comprising multiple such subcircuits for performing multi-channel P2R.

Figure 1A:
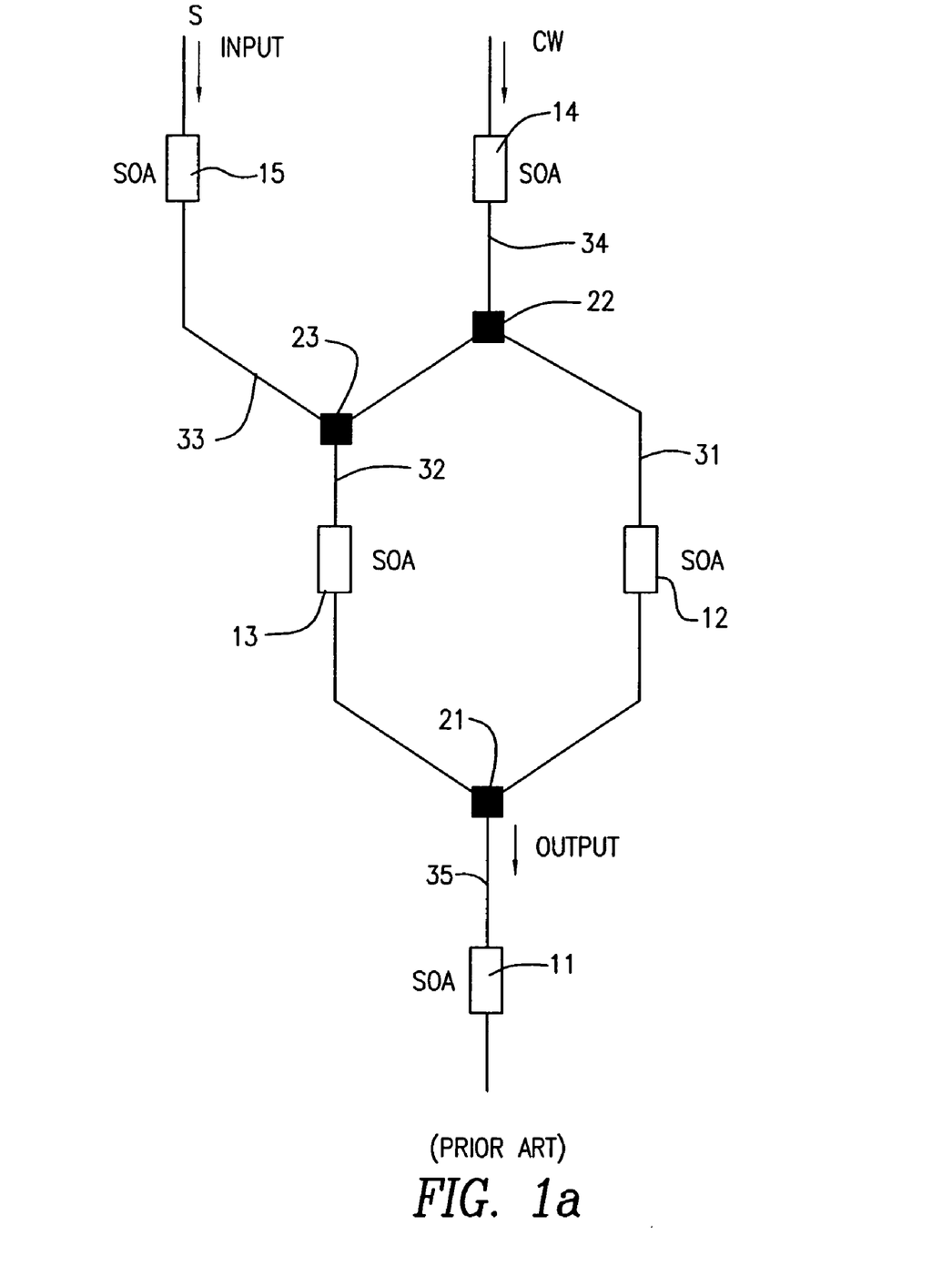
FIGS. 1a and 1b illustrate co-propagative operation mode and counter-propagative operation mode in a MZ interferometer in the prior art.
Figure 1B:
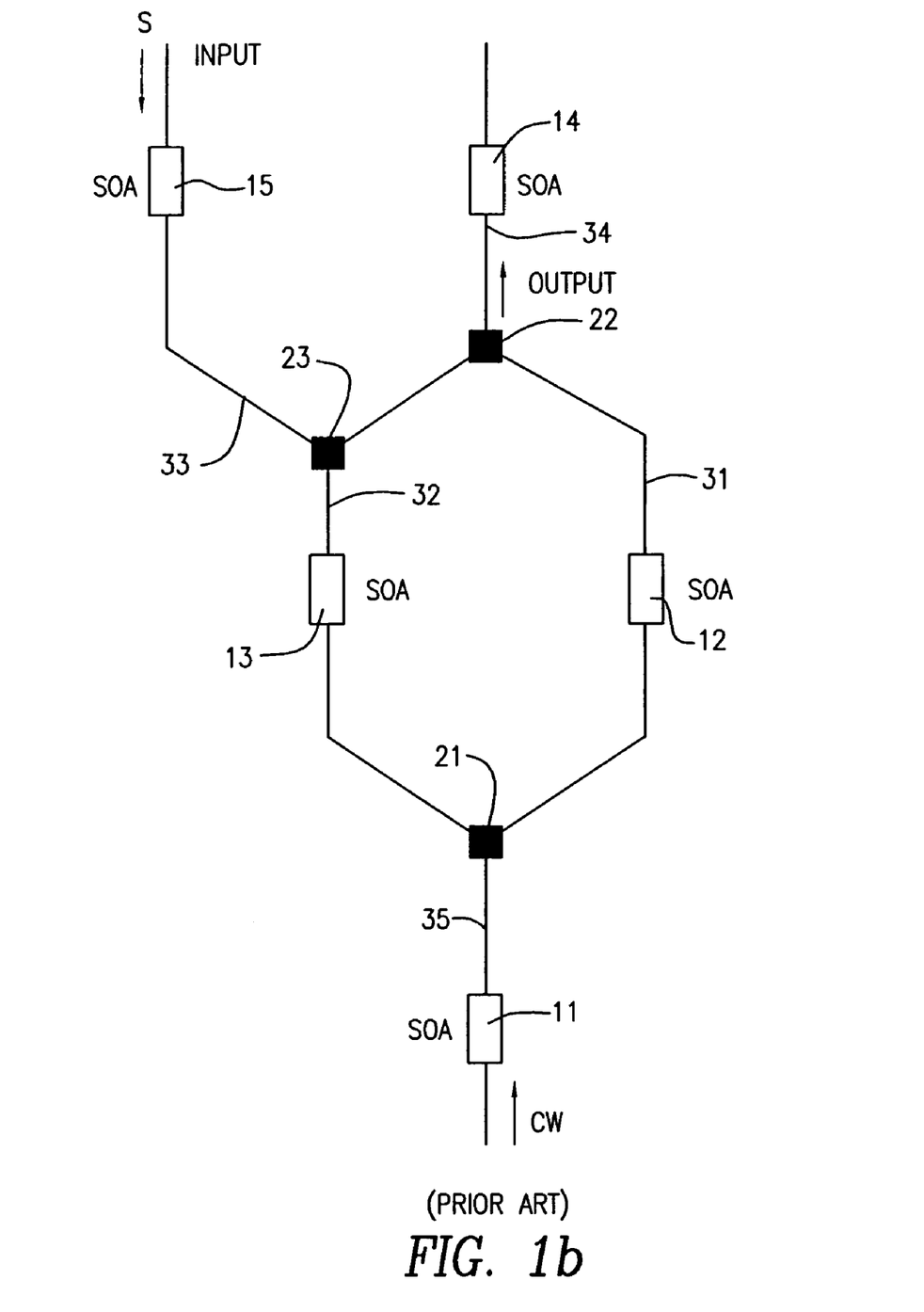

P2R is an important function that lends itself to photonic integration. Photonic integrated circuits (PICs) realize several functions such as amplification, splitting, combining, filtering, and grooming on a single chip, and are key enablers of cheap and efficient network operation. All-optical regeneration and reshaping overcomes many limitations of electrical or optoelectronic counterparts, such as limitations on data rate, cost, flexibility, footprint, power consumption, etc. FIGS. 1a and 1b illustrate using a Mach-Zehnder (MZ) interferometer to perform P2R in counter-propagative and co-propagative operation modes, respectively.

FIG. 1a shows an co-propagative operation mode in which an input signal S from an arm 33 entering an arm 32 of a MZ interferometer at a coupler 23 is regenerated as an output at a coupler 21 by interference at coupler 21 between a continuous wave (CW) signal from arm 34 traveling through two optical paths or arms 31 and 32 of the interferometer. Each arm 31, 32 is coupled to a semiconductor optical amplifier (SOA) 12, 13 respectively, which works as a phase shifter as well as a signal amplifier. The input signal S interacts with the CW signal in arm 32 and causes it to change phase. Due to the well-known Cross-phase modulation (XPM) effect, the CW signal in arm 32 has a phase difference when the input signal S is in its high than when the input signal S is in its low. This phase difference induced by XPM is tuned to be 180 degrees, e.g., by tuning drive currents in the SOAs. The phase of the CW signal from arm 31 remains the same at the coupler 21, irrespective of whether the input signal S is in its high or low state.

In addition, the drive currents of SOAs 12, 13 in the arms 31, 32 are tuned such that, when the input signal is in its low, the CW signals from the two arms 31, 32 are 180 degrees out of phase at the coupler 21. Thus, when the input signal is low, the CW signals from the two arms 31, 32 destructively interfere with each other and generate a "0" output at the coupler 21, and when the input signal is in its high, the phase of the CW signal in the arm 32 is flipped by the input signal S, thus constructively interferes at the coupler 21 with the CW signal from the arm 31 and generates an high output. If the amplitude of the CW signals out of arms 31, 32 is "A", the amplitude of the overall output generated at the coupler 21 will be $4A^2$. Thus, the input signal S is regenerated as the overall output at the coupler 21 by interference between the CW signals from the arms 31, 32.

However, because the input signal S, which is modulated in the CW signal in arm 32, also reaches the output arm 35 through the arm 32, it represents a source of noise and would need to be filtered out. This would not be possible if the input signal S and the CW signal input are at the same wavelength. Therefore, a wavelength conversion has to be performed in co-propagation based devices.

FIG. 1b shows a circuit operates in a counter-propagative mode. As illustrated in FIG. 1b, a CW signal from arm 35 enters an MZ interferometer at the coupler 21, thus the CW signal in the arm 32 travels in a direction opposite to that of the input signal S traveling in arm 32. Similar to the co-propagative mode, the drive currents of SOAs 12, 13 in the arms 31, 32 are tuned such that, when the input signal is in its low, the CW signals from the two arms 31, 32 have 180 degree out of phase at the coupler 22. Thus, when the input signal S is in its low, the CW signals from the two arms 31, 32 destructively interfere with each other and generates a "0" output at the coupler 22, and when the input signal is in its high, the phase of the CW signal in the arm 32 is flipped by the input signal S, thus constructively interferes at the coupler 22 with the CW signal from the arm 31 and generates an high output. Therefore, the input signal S is regenerated as the overall output at the coupler 22 by interference between the CW signals from the arms 31, 32.

For the device to function effectively as an amplifier, it needs to support weak input signals. However, to flip the phase of the CW signal in the arm 32 when the input signal S is in its high, the input signal must be strong enough, i.e., approximately equal in intensity to the CW signal in arm 32. To this end, a preamplifier SOA 15 is provided to preamplify the input signal S before it enters the arm 31 at the coupler 23. Therefore, the SOA 15 in arm 33 needs to be effective in amplifying a weak input signal S. However, the CW signal in the arm 32 also reaches SOA 15 via arm 33 through the coupler 23. Since the CW signal in arm 32 is typically much stronger than the input signal S, it saturates the SOA 15. Therefore, SOA15 cannot pre-amplify the weak input signal.

Therefore, there is a need for an improved photonic integrated circuit that can overcome the above shortcomings in the prior art.

SUMMARY OF THE INVENTION

The present invention provides a photonic integrated circuit which comprises an interferometer having a first optical path and a second optical path configured for regenerating an input signal entering the first optical path by interference at a first coupler between continuous wave (CW) signals from the two optical paths, and means for canceling, at a second coupler, a traveling signal from the first optical path. Preferably, the means for canceling comprises a third optical path configured such that a canceling signal passing therethrough and the traveling signal from the first optical path meeting at the second coupler have a same amplitude and a destructive phase difference so that they cancel each other at the second coupler.

In a preferred embodiment, the interferometer operates in a counter-propagative mode, and the traveling signal to be canceled is the CW signal passing through the first path. Thus, the CW signal from the first path will not reach a preamplifier for amplifying the input signal before it enters the first path.

In another preferred embodiment, the interferometer operates in a co-propagative mode, and the traveling signal to be canceled is an input signal passing through the first path. Thus, the input signal modulated with the CW signal in the first path can be cancelled before it reaches the first coupler. Therefore the output at the first coupler does not have a noise from the input signal. No filter for filtering the noise caused by the input signal is needed, and the device can work in a co-propagative operation mode even when the input signal and the CW signal have the same wavelength.

Preferably, the first optical path and the second optical path form the two arms of a first MZ interferometer, and the first optical path and the third optical path form the two arms of a second MZ interferometer.

Preferably, each of the first path and the third path is coupled to a respective SOA operated under saturation conditions, and drive currents of the SOAs are tuned to realize a destructive phase difference, at the second coupler, between the canceling signal from the third path and the traveling signal from the first path.

Preferably, the canceling signal and the traveling signal come from the same source signal by splitting the source signal at a coupler connecting the first and third optical paths. Preferably, when the device operates in a counter-propagative mode, the canceling signal and the traveling signal come from the same CW signal input; when the device operates in a co-propagative mode, the canceling signal and the traveling signal come from the same original input signal.

In a preferred embodiment, two or more photonic integrated subcircuits are incorporated to form a single multi-channel circuit. Preferably, alternative subcircuits are operated in co and counter propagative modes.

BRIEF EXPLANATION OF THE DRAWINGS

The above and other features and advantages of the present invention will become clearer after reading the detailed description of the preferred embodiments according to the present invention with reference to the accompanying drawings in which.

DETAILED EXPLANATION OF PREFERRED EMBODIMENTS

The present invention will be described in detail below with the preferred embodiments, in which similar reference numbers designate similar elements throughout the drawings.

Figure 2:
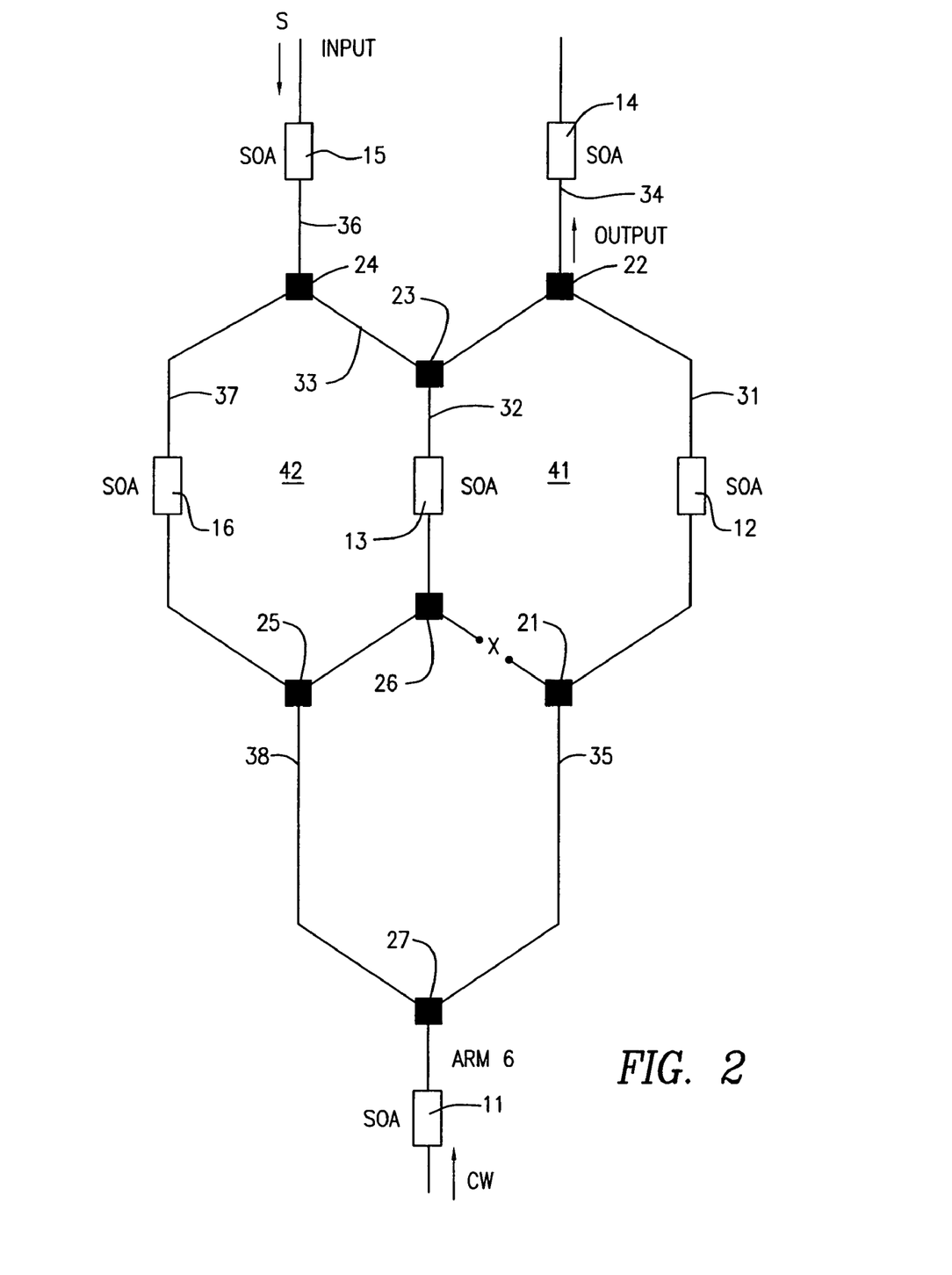
FIG. 2 illustrates an embodiment of the photonic integrated circuit according to the present invention, in which the circuit is operated in a counter-propagative mode.

FIG. 2 illustrates a photonic integrated circuit of a preferred embodiment according to the teaching of the present invention, which is operated in a counter-propagative mode. In particular, a MZ interferometer 41 comprises two arms 31 and 32, each coupled with an SOA 12, 13 respectively. An input signal S enters the arm 32 at a coupler 23 and travels downward along the arm 32, while continuous wave (CW) signals travel upwards through both the arms 31 and 32 of the MZ interferometer 41. The CW signals traveling through the arms 31 and 32 meet and interfere with each other at the coupler 22 to generate an output representing the input signal S, as in the prior art shown in FIG. 1a.

Preferably, an SOA 15 is provided to amplify the input signal S so that a weak input signal can be amplified to be strong enough to flip the phase of the CW signal in the arm 32.

According to the teaching of the present invention, the CW signal from the arm 32 is cancelled before it arrives the preamplifier SOA 15. In the preferred embodiment as illustrated in FIG. 2, an optical path or arm 37 is provided to be connected with the arm 32 by couplers 24 and 25 at opposite ends, forming another MZ interferometer 42. The circuit is preferably of a "honeycomb" architecture as illustrated. The input signal S entering the arm 32 at the coupler 23 is provided through the coupler 24 and is amplified by SOA 15 before it reaches the coupler 24. Preferably, the arm 37 is coupled with an SOA 16.

According to the teaching of the present invention, a CW signal travels upwards through the arm 37 to meet with, at the coupler 24, the CW signal from arm 32 traveling upwards through the coupler 23 and the arm 33. Drive currents in the SOAs 16 and 13 are tuned such that the CW signal from the arm 37 and the CW signal from the arm 32 meeting at the coupler 24 have the same amplitude and a destructive phase difference (preferably −180 degree) so that they cancel each other at the coupler 24 due to destructive interference. Thus, no CW signal reaches SOA 15, and therefore SOA 15 can effectively amplify the input signal S so that it can be strong enough to flip the phase of the CW signal in arm 32 when the input signal is in its high.

Preferably, SOAs 16 and 13 are operated under saturation conditions, so that tuning the drive currents of them only changes their phases. Preferably, SOAs 16 and 13 are identical.

Preferably, the CW signals traveling through arms 37, 32 and 31 are from the same CW signal input. In particular, as illustrated in FIG. 2, a CW signal input is divided at coupler 27 between arms 35 and 38 and then enters the arms 31, 32 and 37 of the two MZ interferometers 41 and 42 at couplers 21, 26 and 25 respectively. It is noted that the section between the couplers 21 and 26 of the MZ interferometer 41 is broken, so that the power entering arms 31 and 32 of the interferometer 41 are equal, and advantageously there is no interference between the CW signals while entering arm 32.

In a preferred embodiment, all the couplers 21–27 illustrated in FIG. 2 are 50/50 Multi-mode Interference (MMI) couplers. However, it is to be understood that they can be designed with other splitting ratios.

Preferably, all the three SOAs 12, 13 and 16 in the three arms 31, 32 and 37 are identical. However, they may be not identical, depending on intended applications. Alternatively, they may be replaced by other types of phase shifters.

Preferably, an SOA 11 is provided to pre-amplify the CW signal input before it arrives at the coupler 27.

Preferably, an SOA 14 is provided to amplify the output at the coupler 22.

Figure 3:
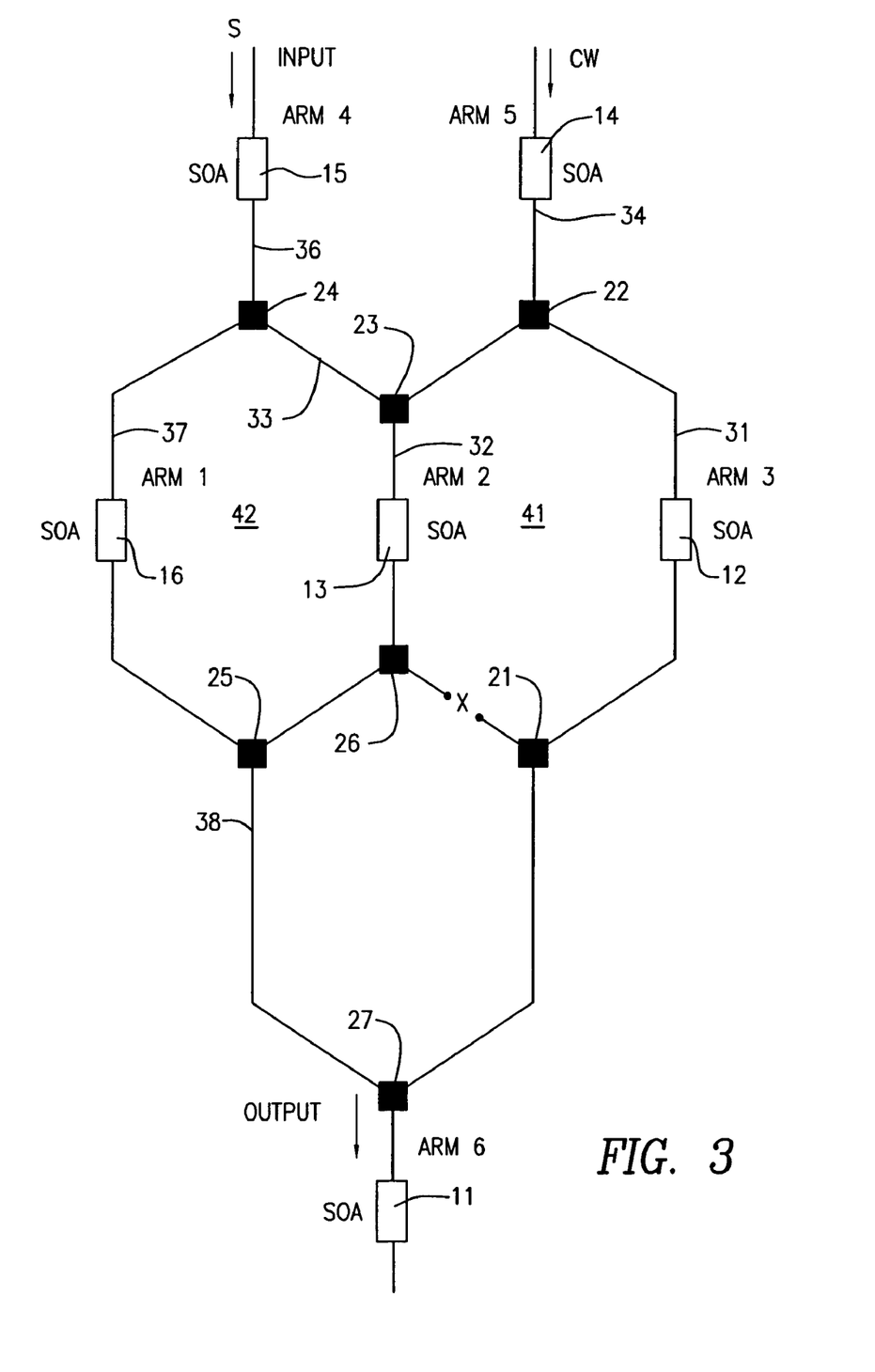
FIG. 3 illustrates another embodiment of the photonic integrated circuit according to the present invention, in which the circuit is operated in a co-propagative mode.

FIG. 3 illustrates a photonic integrated circuit of honeycomb architecture of another preferred embodiment according to the teaching of the present invention, which is operated in a co-propagative mode. In particular, a MZ interferometer 41 comprises two arms 31 and 32, each coupled with an SOA 12, 13 respectively. An input signal S enters the arm 32 at a coupler 23 and travels downward along the arm 32, and continuous wave (CW) signals also travel downwards through the arms 31 and 32 of the MZ interferometer 41. The CW signals traveling through the arms 31 and 32 meet and interfere with each other at the coupler 27 to generate an output representing the input signal S, as in the prior art shown in FIG. 1b. It is noted that the section between the couplers 21 and 26 in the MZ interferometer 41 is broken.

Preferably, an SOA 15 is provided to amplify the input signal S so that a weak input signal will be amplified to be strong enough to flip the phase of the CW signal in the arm 32.

According to the teaching of the present invention, the input signal from the arm 32 is cancelled before it arrives at the coupler 27. In the preferred embodiment as illustrated in FIG. 3, an optical path or arm 37 is provided to be connected with the arm 32 by couplers 24 and 25 at opposite ends, forming another MZ interferometer 42. Preferably, an SOA 16 is coupled with arm 37.

According to the teaching of the present invention, a canceling signal travels downwards through the arm 37 to meet with, at the coupler 25, the input signal (which is modulated with the CW signal) in arm 32 traveling downwards through the the arm 32. Drive currents in the SOAs 16 and 13 are tuned such that the canceling signal from the arm 37 and the input signal from the arm 32 meeting at the coupler 25 have the same amplitude and a destructive phase difference so that they cancel each other at the coupler 25. Thus, no input signal reaches coupler 27, and therefore the overall output generated at the coupler 27 does not have a noise from the input signal. No filter for filtering the input signal is needed, and therefore the device can work in the co-propagative mode even when the input signal and the CW signal have the same wavelength.

Preferably, SOAs 16 and 13 are operated under saturation conditions so that tuning the drive currents of them only changes their phases. Preferably, SOAs 16 and 13 are identical.

Preferably, the canceling signal traveling through the arm 37 and the input signal traveling through the arm 32 are from the same original input signal S. In particular, as illustrated in FIG. 3, the original input signal S input is divided at coupler 24 between arms 32 and 37 after it is preamplifies by SOA 15.

In a simplified embodiment, all the couplers 22–27 illustrated in FIG. 3 are 50/50 Multi-mode Interference (MMI) couplers. However, it is to be understood that they can be designed with other splitting ratios.

Preferably, all the three SOAs 12,13 and 16 in the three arms 31, 32 and 37 are identical. However, they may be not identical, depending on intended applications. Alternatively, they may be replaced by other types of phase shifters.

Preferably, an SOA 14 is provided to preamplify the CW signal input before it enters the MZ interferometer 41 at the coupler 27.

Preferably, an SOA 11 is provided to amplify the output at the coupler 27.

Preferably, a multi-channel optical circuit may incorporate multiple subcircuits. Preferably, at least some of the subcircuits are those according to the present invention as described above. Preferably, the subcircuits are arranged such that alternative subcircuits are operated in co and counter propagative modes, respectively. Preferably, adjoining subcircuits share a common optical path.

Figure 4:
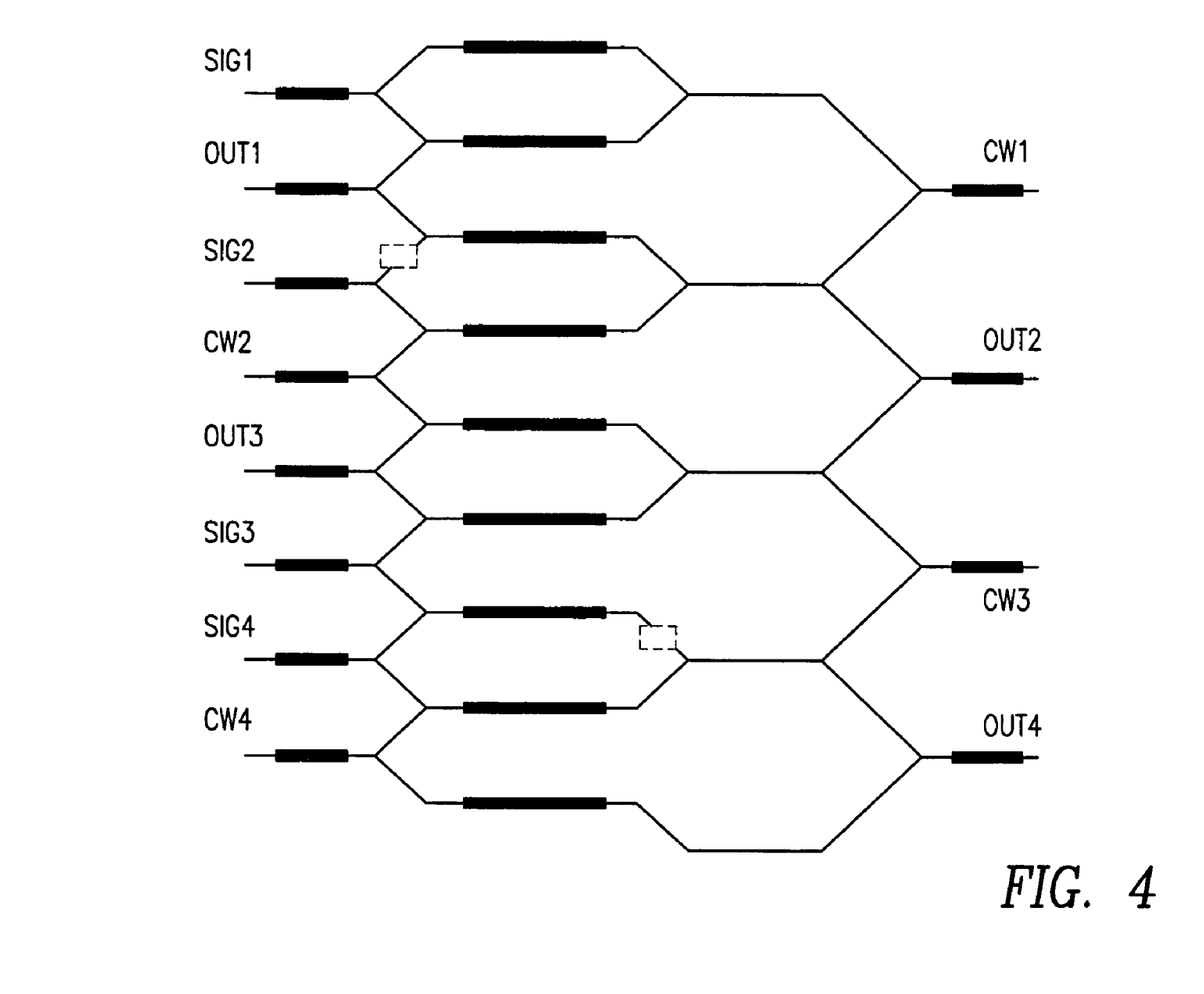
FIG. 4 illustrates a multi-channel circuit incorporating multiple photonic integrated circuits shown in FIGS. 2 and 3.

As a preferred embodiment, FIG. 4 shows a multi-channel arrangement comprising four subcircuits. The two subcircuits associated with signals 1 and 3 have a "honeycomb" architecture and are operated in the counter-propagative mode (as illustrated in FIG. 2), and the two subcircuits associated with signals 2 and 4 use conventional co-propagation based WL conversion. Overall, the multi-channel circuit is more compact than isolated single channel circuits that implement the same functionality. This is because a single arm of the design wears different hats and can be a part of different interferometers.

The above have described in detail the preferred embodiments of the present invention. However, it should be appreciated that without departing the gist of the present invention, numerous adaptations, variations and modifications are possible to a person skilled in the art. For example, with proper designs, the couplers and SOAs in the embodiments do not have to be identical, and the broken section between the couplers 21 and 26 may be connected. Therefore, the scope of the present invention is intended to be solely defined in the claims.

What is claimed is:

1. A integrated optical circuit, comprising:
an interferometer having a first optical path and a second optical path configured for regenerating an input signal entering said first path by interference at a first coupler between continuous wave (CW) signals from said two optical paths;
means for canceling, at a second coupler, a traveling signal from said first path;
wherein said means for canceling comprises a third optical path configured such that a signal passing therethrough and said traveling signal from said first path meet at said second coupler, said signal passing therethrough and said traveling signal having a same amplitude and a destructive phase difference therebetween;
wherein each of said three optical paths is coupled to a respective phase shifter;
wherein each said phase shifter is a semiconductor optical amplifier (SOA);
wherein drive currents of said SOAs coupled in said first and third paths are tuned such that said destructive phase difference at said second coupler is realized; and
wherein said SOAs in said first and third paths are operated under a saturation condition.

2. A integrated optical circuit, comprising:
an interferometer having a first optical path and a second optical path configured for regenerating an input signal entering said first path by interference at a first coupler between continuous wave (CW) signals from said two optical paths;
means for canceling, at a second coupler, a traveling signal from said first path;
wherein said means for canceling comprises a third optical path configured such that a signal passing therethrough and said traveling signal from said first path meet at said second coupler, said signal passing therethrough and said traveling signal having a same amplitude and a destructive phase difference therebetween;
wherein said CW signal in said first path and said input signal in said first path travel in opposite directions, and said traveling signal in said first path is said CW signal; and
wherein said input signal enters said first path at a third coupler after it passes through said second coupler.

3. The circuit of claim 2, wherein said input signal is amplified by a preamplifier before entering said second coupler.

4. The circuit of claim 3, wherein said preamplifier is an SOA.

5. A photonic integrated circuit, comprising:
a first MZ interferometer having a first arm and a second arm configured for regenerating an input signal entering said first arm at a first coupler through an injection path by interference, at a second coupler, between a first continuous wave (CW) signal passing through said first arm in a counter direction to said input signal and a second CW signal passing through said second arm; and a third arm configured such that a third CW signal passing through said third arm cancels, at a third coupler, said first CW signal via said injection path through said first coupler.

6. The circuit of claim 5, wherein said input signal enters said injection path through said third coupler.

7. The circuit of claim 6, wherein said third arm and said first arm are configured such that said first and third CW signals have a same amplitude with a destructive phase difference at said third coupler.

8. The circuit of claim 7, wherein each of said first arm and third arm is coupled with a respective SOA operated under a saturation condition, and drive currents of said first and third SOAs are tuned such that said destructive phase difference at said third coupler is realized.

9. The circuit of claim 6, wherein said input signal is amplified by a preamplifier before arriving said third coupler.

10. The circuit of claim 7, wherein said preamplifier is an SOA.

11. The circuit of claim 5, wherein said first arm and said second arm are configured such that said CW signals meeting at said second coupler have a same amplitude with a destructive phase difference when said input signal is at its low, and have a constructive phase difference when said input signal is at its high.

12. The circuit of claim 11, wherein said constructive phase difference is realized by flipping said phase in said first arm by said input signal at its high.

13. The circuit of claim 12, wherein each of said first and second arms is coupled to a respective SOA, and said destructive phase difference is realized by tuning drive currents of said SOAs.

14. The circuit of claim 5, wherein said third arm and said first arm form two arms of a second MZ interferometer, and said CW signals in said three arms come from a common CW signal input.

15. A photonic integrated circuit, comprising:
an MZ interferometer having a first arm and a second arm configured for regenerating an input signal entering said first arm at a first coupler by interference, at a second coupler, between a first continuous wave (CW) signal passing through said first arm in the same direction as said input signal and a second CW signal passing through said second arm;

a third arm configured such that a canceling signal passing therethrough cancels said input signal at a third coupler before said input signal arrives at said second coupler;

wherein said first arm and said third arm are configured such that said canceling signal and said input signal have a same amplitude with a destructive phase difference at said third coupler; and wherein each of said first arm and third arm is coupled with a respective SOA operated under a saturation condition, and drive currents of said first and third SOAs are tuned such that said destructive phase difference at said third coupler is realized.

16. A photonic integrated circuit, comprising:
a first MZ interferometer and a second MZ interferometer each having two arms, wherein said two MZ interferometers share one of said two arms;

wherein said first MZ interferometer is configured for accepting an input signal in said shared arm, while said second MZ interferometer is configured for generating an output representing said input signal by interference, at a first coupler connecting said two arms of said second MZ interferometer, between continuous wave (CW) signals passing through said two arms of said second MZ interferometer;

wherein said two arms of said first MZ interferometer are configured such that a traveling signal passing through said shared arm is canceled, at a second coupler connecting said two arms in said first MZ interferometer, by a canceling signal traveling through the other arm of said first MZ interferometer; and wherein each of said two arms of said first MZ interferometer is coupled to a respective SOA operated under a saturation condition, and drive currents of said SOAs in said two arms of said first MZ interferometer are tuned such that said canceling signal and said traveling signal meeting at said second coupler have a same amplitude with a destructive phase difference.

17. A photonic integrated circuit, comprising at least two subcircuits, at least one of said subcircuits having a first MZ interferometer having a first arm and a second arm and a second MZ interferometer having said first arm and a third arm;

wherein said at least two subcircuits share a common optical path;

wherein said first MZ interferometer is configured for accepting an input signal in said first arm, while said second MZ interferometer is configured for generating an output representing said input signal by interference, at a first coupler connecting said first and third arms, between continuous wave (CW) signals passing through said first and third arms;

wherein said first and second arms are configured such that a traveling signal passing through said first arm is canceled, at a second coupler connecting said first and second arms, by a canceling signal traveling through said second arm; and wherein each of said first and second arms is coupled to a respective SOA operated under a saturation condition, and drive currents of said SOAs in said first and second arms are tuned such that said canceling signal and said traveling signal meeting at said second coupler have a same amplitude with a destructive phase difference.

18. The circuit of claim 17, wherein each of said first and third arms is coupled to a respective SOA, and drive currents of said SOAs in said first and third arms are configured such that said CW signals have a same amplitude with a destructive phase interference at said first coupler when said input signal is at its low, and have a same amplitude with a constructive phase difference at said first coupler when said input signal is at its high.

19. The circuit of claim 18, wherein said CW signal in said first arm and said input signal in said first arm travel in opposite directions, and said traveling signal is said CW signal.

20. The circuit of claim 19, wherein said input signal is provided to said first MZ interferometer through said second coupler after it is amplified by a preamplifier.

21. The circuit of claim 19, wherein said canceling signal in said second arm and said CW signals in said first and third arms come from a common CW signal input.

22. The circuit of claim 18, wherein said CW signal in said first arm and said input signal in said first arm travel in a same direction, and said traveling signal is said input signal.

23. The circuit of claim 22, wherein said second coupler is located such that said input signal is cancelled at said second coupler before it arrives at said first coupler.

24. The circuit of claim 23, wherein said canceling signal and said input signal come from a common original input signal.

25. The circuit of claim 18, wherein, in one of said subcircuits, said CW signal in said first arm and said input signal in said first arm travel in opposite directions, and said traveling signal is said CW signal, and in another of said subcircuits, said CW signal in said first arm and said input signal in said first arm travel in a same direction, and said traveling signal is said input signal.

26. The circuit of claim 18, wherein in one of said subcircuits said CW signal in said first arm and said input signal in said first arm travel in a same direction, and said traveling signal is said input signal.

* * * * *